United States Patent
Nishigaki et al.

(10) Patent No.: US 6,853,738 B1
(45) Date of Patent: Feb. 8, 2005

(54) OPTICAL OBJECT RECOGNITION SYSTEM

(75) Inventors: Morimichi Nishigaki, Tochigi (JP); Masakazu Saka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,249

(22) Filed: May 17, 2000

(30) Foreign Application Priority Data

Jun. 16, 1999 (JP) .......................................... 11-169567

(51) Int. Cl.[7] ................................................ G06K 9/00
(52) U.S. Cl. ..................... 382/106; 356/3.14; 348/139; 348/142; 701/300; 382/225; 382/180
(58) Field of Search ................................ 382/103, 104, 382/106, 154, 180, 225; 356/3, 3.13–3.14, 3.16; 348/139, 142; 340/901, 903; 701/300

(56) References Cited

U.S. PATENT DOCUMENTS

| | | | | |
|---|---|---|---|---|
| 5,999,635 A | * | 12/1999 | Higashikubo et al. | 382/104 |
| 6,122,597 A | * | 9/2000 | Saneyoshi et al. | 701/301 |
| 6,125,191 A | * | 9/2000 | Mashimo et al. | 382/104 |
| RE37,610 E | * | 3/2002 | Tsuchiya et al. | 169/16 |
| 6,370,262 B1 | * | 4/2002 | Kawabata | 382/106 |

FOREIGN PATENT DOCUMENTS

| | | | | |
|---|---|---|---|---|
| JP | 06-150196 | 5/1994 | ............ | G08G/1/16 |
| JP | 09-079821 | 3/1997 | ............ | G01B/11/00 |

* cited by examiner

Primary Examiner—Jon Chang
Assistant Examiner—Charles Kim
(74) Attorney, Agent, or Firm—Lahive & Cockfield, LLP; Anthony A. Laurentano, Esq.

(57) ABSTRACT

An object recognition system comprises a memory for storing a plurality of distance ranges with different distance labels associated with respective distance ranges. The controller converts measured distance values into distance labels according to distance ranges to which the distance values belong. The controller groups the sections or windows of a captured image based on assigned distance labels. Detection area or viewing area of the sensors is divided into a plurality of distance ranges according to tolerance of the measured distance such that broader distance range is defined as the distance from the system is larger. The controller scans the windows with distance labels using a template that defines a joining relationship for the windows and assigns each window with a cluster label that is a combination of the distance label and a occurrence indicia, which is the same for the windows that satisfy the joining relationship. The controller unites the windows having the same cluster labels into a cluster, generates three dimensional data of each of said clusters and combines the clusters that are positioned close to each other based on the three dimensional data to form a candidate of a physical object. The system includes a memory for storing three dimensional data of one or more physical objects that were recognized in previous recognition cycle. The controller infers a physical object which would be recognized in the current cycle based on the stored data and a speed of the vehicle relative to the physical object. The controller compares the inferred physical object with said candidate of a physical object to recognize a physical object.

18 Claims, 14 Drawing Sheets

(a)

(b)

(a)

(b)

Distance Conversion Table

| Distance Range | | Distance Label |
|---|---|---|
| S 1 | 0 m ≦ Distance < 2 m | 1 |
| S 2 | 2 m ≦ Distance < 5 m | 2 |
| S 3 | 5 m ≦ Distance < 9 m | 3 |
| S 4 | 9 m ≦ Distance < 1 4 m | 4 |
| S 5 | 1 4 m ≦ Distance < 2 0 m | 5 |
| S 6 | 2 0 m ≦ Distance < 2 7 m | 6 |

Fig.5

| Distance | Distance Label | Distance | Distance Label |
|---|---|---|---|
| 0 | 0 | 20 | 9 |
| 1 | 1 | 21 | 9 |
| 2 | 2 | 22 | 9 |
| 3 | 3 | 23 | 9 |
| 4 | 4 | 24 | 9 |
| 5 | 4 | 25 | 9 |
| 6 | 5 | 26 | 9 |
| 7 | 5 | 27 | 10 |
| 8 | 6 | 28 | 10 |
| 9 | 6 | 29 | 10 |
| 10 | 6 | 30 | 10 |
| 11 | 7 | 31 | 10 |
| 12 | 7 | 32 | 10 |
| 13 | 7 | 33 | 10 |
| 14 | 7 | 34 | 10 |
| 15 | 8 | 35 | 10 |
| 16 | 8 | 36 | 11 |
| 17 | 8 | . | . |
| 18 | 8 | . | . |
| 19 | 8 | . | . |

Fig.6

| 5 | 7 | 9 | 15 | 12 | 24 | 10 | 10 |
|---|---|---|----|----|----|----|----|
| 25 | 16 | 24 | 26 | 25 | 5 | 8 | 23 |
| 1 | 18 | 22 | 17 | 15 | 9 | 5 | 12 |
| 25 | 11 | 23 | 5 | 19 | 10 | 26 | 3 |
| 25 | 21 | 3 | 18 | 7 | 18 | 25 | 24 |
| 21 | 15 | 26 | 20 | 20 | 4 | 6 | 4 |
| 21 | 17 | 2 | 14 | 13 | 5 | 10 | 9 |
| 22 | 16 | 11 | 13 | 12 | 8 | 7 | 19 |

(a) Measured Distance

| 3 | 3 | 4 | 5 | 4 | 6 | 4 | 4 |
|---|---|---|---|---|---|---|---|
| 6 | 5 | 6 | 6 | 6 | 3 | 3 | 6 |
| 1 | 5 | 6 | 5 | 5 | 4 | 3 | 4 |
| 6 | 4 | 6 | 3 | 5 | 4 | 6 | 2 |
| 6 | 6 | 2 | 5 | 3 | 5 | 6 | 6 |
| 6 | 5 | 6 | 6 | 6 | 2 | 3 | 2 |
| 6 | 5 | 2 | 5 | 4 | 3 | 4 | 4 |
| 6 | 5 | 4 | 4 | 4 | 3 | 3 | 5 |

W31, W48, W53, W73, W66, W68

(b) Distance Label

| 3 | 3 | 4 | 5 | 4 | 6 | 4 | 4 |
|---|---|---|---|---|---|---|---|
| 6 | 5 | 6 | 6 | 6 | 3 | 3 | 6 |
| 0 | 5 | 6 | 5 | 5 | 4 | 3 | 4 |
| 6 | 4 | 6 | 3 | 5 | 4 | 6 | 0 |
| 6 | 6 | 0 | 5 | 3 | 5 | 6 | 6 |
| 6 | 5 | 6 | 6 | 6 | 0 | 3 | 0 |
| 6 | 5 | 0 | 5 | 4 | 3 | 4 | 4 |
| 6 | 5 | 4 | 4 | 4 | 3 | 3 | 5 |

(c) Distance Label

| 31 | 31 | 41 | 51 | 42 | 61 | 43 | 43 |
|----|----|----|----|----|----|----|----|
| 62 | 52 | 63 | 63 | 63 | 32 | 32 | 64 |
| 0 | 52 | 63 | 53 | 53 | 44 | 32 | 45 |
| 64 | 46 | 63 | 33 | 53 | 44 | 65 | 0 |
| 64 | 64 | 0 | 54 | 34 | 55 | 65 | 65 |
| 64 | 56 | 66 | 66 | 66 | 0 | 35 | 0 |
| 64 | 56 | 0 | 57 | 49 | 36 | 48 | 48 |
| 64 | 56 | 49 | 49 | 49 | 36 | 36 | 58 |

(d) Cluster Label (e) After Clustering

|   | Conditions | Results | |
|---|---|---|---|
|   |   | Cluster Label D | Combined Cluster Labels |
| 1 | d=0 | O |   |
| 2 | d≠0, a≠d, b≠d, c≠d | L |   |
| 3 | d≠0, a≠d, b=d, c≠d, e≠d | L |   |
| 4 | d≠0, a≠d, c=d | C |   |
| 5 | d≠0, a≠d, b=d, c≠d, e=d | B |   |
| 6 | d≠0, a=d, c≠d | A |   |
| 7 | d≠0, a=d, c=d, A=C | A |   |
| 8 | d≠0, a=d, c=d, A≠C | A | (A, C) |

|   |   |   |   |
|---|---|---|---|
| 0 | 0 | 0 | 0 |
| 0 | 6 | 6 | 0 |
| 0 | 6 | 6 | 0 |
| 0 | 0 | 0 | 0 |

(a)

|   |   |   |   |
|---|---|---|---|
| 0 | 0 | 0 | 0 |
| 0 | 61 |  |  |
|   |   |   |   |
|   |   |   |   |

(b)

|   |   |   |   |
|---|---|---|---|
| 0 | 0 | 0 | 0 |
| 0 | 61 | 61 |  |
|   |   |   |   |
|   |   |   |   |

(c)

|   |   |   |   |
|---|---|---|---|
| 0 | 0 | 0 | 0 |
| 0 | 61 | 61 | 0 |
| 0 | 61 |  |  |
|   |   |   |   |

(d)

|   |   |   |   |
|---|---|---|---|
| 0 | 0 | 0 | 0 |
| 0 | 61 | 61 | 0 |
| 0 | 61 | 61 | 0 |
| 0 | 0 | 0 | 0 |

(e)

|   |   |   |   |
|---|---|---|---|
| W11 | W12 | W13 | W14 |
| W21 | W22 | W23 | W24 |
| W31 | W32 | W33 | W34 |
| W41 | W42 | W43 | W44 |

| # of Combined Clusters | Combined Clusters | Inferred Object | Functional Value E1 |
|---|---|---|---|
| 1 | C 2 2 | 7 5 | e 01 |
| 2 | C 2 3 | 7 5 | e 02 |
| 3 | C 2 4 | 7 5 | e 03 |
| 4 | C 2 5 | 7 5 | e 04 |
| 5 | C 2 6 | 7 5 | e 05 |
| 6 | C 2 2 + C 2 3 | 7 5 | e 06 |
| 7 | C 2 2 + C 2 4 | 7 5 | e 07 |
| 8 | C 2 2 + C 2 5 | 7 5 | e 08 |
| 9 | C 2 2 + C 2 6 | 7 5 | e 09 |
| 1 0 | C 2 3 + C 2 4 | 7 5 | e 10 |
| 1 1 | C 2 3 + C 2 5 | 7 5 | e 11 |
| 1 2 | C 2 3 + C 2 6 | 7 5 | e 12 |
| 1 3 | C 2 4 + C 2 5 | 7 5 | e 13 |
| 1 4 | C 2 4 + C 2 6 | 7 5 | e 14 |
| 1 5 | C 2 5 + C 2 6 | 7 5 | e 15 |
| 1 6 | C 2 2 + C 2 3 + C 2 4 | 7 5 | e 16 |
| 1 7 | C 2 2 + C 2 3 + C 2 5 | 7 5 | e 17 |
| 1 8 | C 2 2 + C 2 3 + C 2 6 | 7 5 | e 18 |
| 1 9 | C 2 2 + C 2 4 + C 2 5 | 7 5 | e 19 |
| 2 0 | C 2 2 + C 2 4 + C 2 6 | 7 5 | e 20 |
| 2 1 | C 2 2 + C 2 5 + C 2 6 | 7 5 | e 21 |
| 2 2 | C 2 3 + C 2 4 + C 2 5 | 7 5 | e 22 |
| 2 3 | C 2 3 + C 2 4 + C 2 6 | 7 5 | e 23 |
| 2 4 | C 2 3 + C 2 5 + C 2 6 | 7 5 | e 24 |
| 2 5 | C 2 4 + C 2 5 + C 2 6 | 7 5 | e 25 |
| 2 6 | C 2 2 + C 2 3 + C 2 4 + C 2 5 | 7 5 | e 26 |
| 2 7 | C 2 2 + C 2 3 + C 2 4 + C 2 6 | 7 5 | e 27 |
| 2 8 | C 2 2 + C 2 3 + C 2 5 + C 2 6 | 7 5 | e 28 |
| 2 9 | C 2 2 + C 2 4 + C 2 5 + C 2 6 | 7 5 | e 29 |
| 3 0 | C 2 3 + C 2 4 + C 2 5 + C 2 6 | 7 5 | e 30 |
| 3 1 | C 2 2 + C 2 3 + C 2 4 + C 2 5 + C 2 6 | 7 5 | e 31 |

(b)

OPTICAL OBJECT RECOGNITION SYSTEM

FIELD OF THE INVENTION

The present invention relates to an optical object recognition system which detects objects in front of a vehicle such as an automobile, etc., using image capturing apparatus having cameras mounted on this vehicle. More specifically, the present invention concerns an object recognition system, which recognizes the characteristic features of objects using a plurality of windows in the captured images.

BACKGROUND OF THE INVENTION

In recent years, devices which determine the distance and size of objects in front of a vehicle, and which appropriately control the vehicle in accordance with this judgment, have been proposed for the purpose of improving the safety of vehicle operation.

Japanese Patent Application Kokai No. Hei 9-79821 describes one example of a device in which an optical distance measuring device consisting of two light-receiving elements is used to determine whether an object whose distance has been detected is a physical object or a road area (including characters or white lines on the road surface). The device calculates differences for respective calculation areas, and recognizes areas in which obstructions are present by clustering calculation areas whose mutual distances are within a fixed range and are proximate to each other in the horizontal direction. In the case of this clustering, calculation areas whose distances have not yet been measured are also clustered.

However, when clustering (that corresponds to the abovementioned block formation) is performed with larger number of windows (that corresponds to the abovementioned calculation areas) so that measured distance values can be obtained with a greater degree of fineness, an extremely large amount of time is required for determining whether or not distances are within a specified range according to the scheme as described in Patent Application Kokai No. Hei 9-79821.

Conventionally, furthermore, when the distance ranges are determined beforehand and windows are clustered within these distance ranges, it was necessary to first determine the distance range in which clustering is to be performed based on such factors as a frequency distribution of the distances. Furthermore, when clustering is performed, it was necessary to determine which distance ranges the distance values calculated for the windows belong to and to determine whether or not respective distance ranges are equal to each other. Such process requires a large amount of time.

Furthermore, when the distance ranges in which clustering is performed are fixed as in the device described in Japanese Patent Application Kokai No. Hei 9-79821, precision of the distance value drops as the distance becomes larger. Generally, the calculation of a distance "d" is expressed by the formula "d=C/s (C is a constant)", where "s" is a parallax. While the parallax resolution is constant, the distance resolution drops as the distance becomes larger. As a result, when a physical object is imaged over a plurality of windows, larger error is generated in distance values for respective windows as the distance becomes larger.

For example, referring to FIG. 14($a$), according to the prior art, clustering is performed with a fixed distance range as shown by a pair of arrows. In an area closer to the vehicle, a window with a distance value 101 and a window with a distance value 102, which fall within the fixed distance range, are clustered together. In contrast, a window with a distance value 103 and a window with a distance value 104 are clustered into different clusters in an area further from the vehicle even if the two windows belong to a same object. This is so because they are not within the fixed distance range.

Conversely, when the distance range is set to a larger value so that two windows belonging to the same physical object are clustered into the same cluster in an area further from the vehicle as shown in FIG. 14($b$), the window with a distance value 103 and the window with a distance value 104 may be clustered into a same cluster. However, in an area closer to the vehicle, not only the windows with distance values of 101 and 102, but also the window with a distance value 105 that belongs to a different physical object, are clustered into a same cluster. Thus, if clustering is performed with a fixed distance range, instances arise in which a physical object cannot be formed into a same cluster, and in which different physical objects are included in a same cluster.

Accordingly, one object of the present invention is to provide a system, which makes it possible to recognize objects by clustering windows at a high speed. This is accomplished by performing clustering based on labels corresponding to distance values calculated for the windows. Furthermore, another object of the present invention is to provide an object recognition system, which makes it possible to recognize physical objects by the accurate clustering of windows. This is accomplished by setting distance ranges in accordance with tolerances in measured distances.

SUMMARY OF THE INVENTION

According to one aspect of the invention, an object recognition system having one or more image sensors and a controller adapted for measuring distance to objects for respective windows or sections of an image captured by the sensors is provided. The system comprises a memory for storing a plurality of distance ranges with different distance labels associated with respective distance ranges. The controller converts measured distance values into distance labels according to distance ranges to which the distance values belong. The controller groups the sections or windows of a captured image based on assigned distance labels. Detection area or viewing area of the sensors is divided into a plurality of distance ranges according to tolerance of the measured distance such that broader distance range is defined as the distance from the system is larger.

The controller scans the windows with distance labels using a template that defines a joining relationship for the windows and assigns each window with a cluster label that is a combination of the distance label and a occurrence indicia. The occurrence indicia is the same for the windows that satisfy the joining relationship. The controller unites the windows having the same cluster labels into a cluster.

The controller generates three dimensional data of each of said clusters based on distance from the vehicle, height and width of said clusters and combines the clusters that are positioned close to each other based on the three dimensional data to form a candidate of a physical object. The system includes a memory for storing three dimensional data of one or more physical objects that were recognized in previous recognition cycle. The controller infers a physical object which would be recognized in the current cycle based on the stored data and a speed of the vehicle relative to the physical object. The controller compares the inferred physical object with said candidate of a physical object to recognize a physical object.

The distance of a cluster from the vehicle is determined by averaging distance from the vehicle of the windows constituting the cluster. The height of a cluster is determined by the difference between a position of the window at the top of the cluster and a position of the window at the bottom of the cluster. The width of a cluster is determined by the difference between a position of the window at the right end of the cluster and a position of the window at the left end of the cluster.

The controller may comprise a micro-controller which typically includes a central processing unit (CPU) or a micro-processor, a read-only memory (ROM) containing control programs that when executed by the processor performs respective functions which are to be described hereafter. The controller also includes a random-access memory (RAM) that provides an working area for the CPU and temporary storage for various data and programs.

BRIEF DESCRIPTION OF THE DRAWINGS

FIG. 5 is a table showing the division of distances in accordance with errors of the measured distances.

FIG. 6 is a diagram illustrating clustering scheme in accordance with one embodiment of the present invention.

FIG. 8 is a diagram illustrating the method used to assign cluster labels one embodiment of the present invention.

FIG. 9 is a diagram illustrating the method used to link cluster labels in one embodiment of the present invention.

FIG. 13 is a table showing combinations of clusters in one embodiment of the present invention.

DETAILED DESCRIPTION OF THE INVENTION

Figure 1:
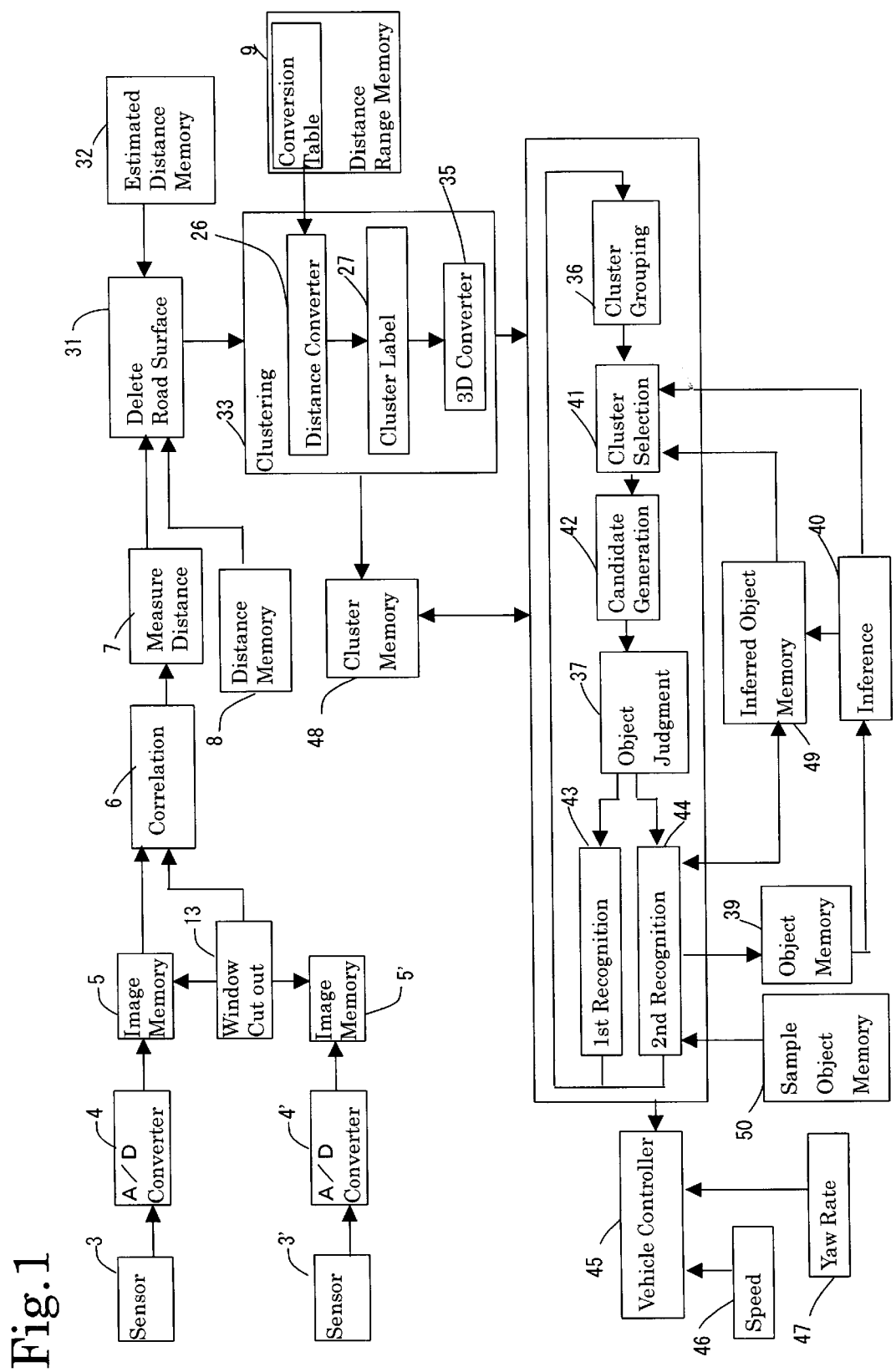
FIG. 1 is a block diagram illustrating the overall structure, and functional blocks of the controller of one embodiment of the present invention.

The invention will now be described relative to preferred embodiments referring to attached figures. FIG. 1 is an overall block diagram of an object recognition system in accordance with one embodiment of the present invention. Other than the sensors 3 and 3', all the blocks in FIG. 1 may be incorporated in a controller which comprises a single chip or multiple chip semiconductor integrated circuit. Thus, FIG. 1 shows functional blocks of the controller. Respective functions of the blocks are performed by executing respective programs stored in the ROM of the controller.

Figure 2:
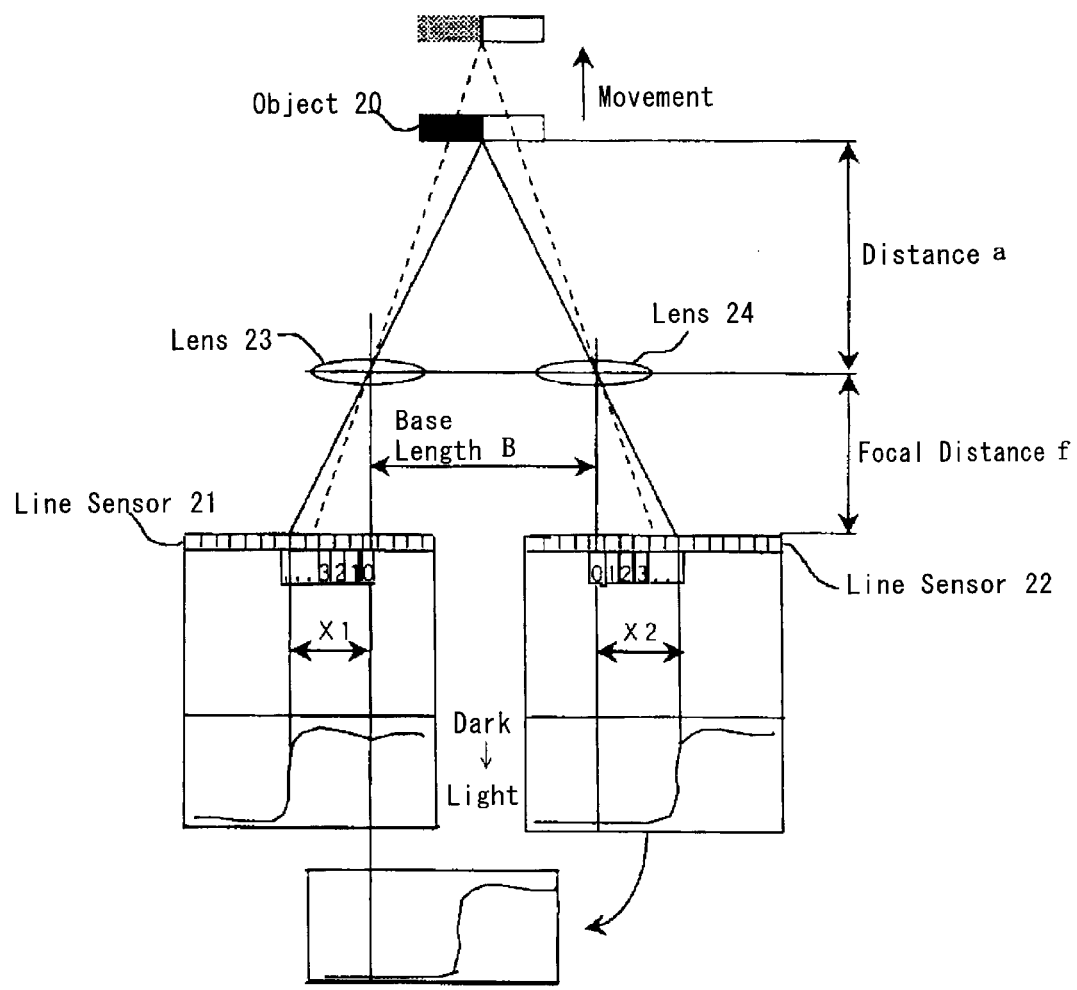
FIG. 2 is a diagram illustrating the principle of measurement by the triangulation method.

FIG. 2 is a diagram which indicates the distance measurement principle based on the triangulation method used in the present embodiment. First, a distance measurement method using a pair of image sensors will be described with reference to FIG. 2. A line sensor 21 and lens 23 constituting one of the abovementioned pair of image sensors are installed at a specified distance, i. e., at a distance equal to the base line length B in the horizontal or vertical direction from the line sensor 22 and lens 24 constituting the other image sensor of the other of the pair. The line sensors 21 and 22 are typically one-dimensional CCDs, but may also be linearly arranged photo-sensor arrays. Considering use at night, image sensors using infrared light are advisable. In this case, it is advisable to install infrared-transparent filters in front of the lenses 23 and 24, and to devise the system so that an object 20 is illuminated at predetermined time intervals using an infrared light source. Infrared light reflected from the object 20 is sensed by the line sensors 21 and 22.

The line sensors 21 and 22 are respectively positioned at the focal lengths "f" of the lenses 23 and 24. Assuming that an image of an object located at distance "a" from the plane of the lenses 23 and 24 is formed at a position shifted by a distance X1 from the optical axis of the lens 23 in the case of the line sensor 21, and is formed at a position shifted by a distance X2 from the optical axis of the lens 24 in the case of the line sensor 22, then, according to the principle of triangulation, the distance a to the object 20 from the plane of the lenses 23 and 24 is determined by the equation: $a = B \cdot f/(X1+X2)$.

In the present embodiment, the images are digitized. And accordingly, the distance (X1+X2) is digitally calculated. The sum of the absolute values of the differences between the digital values indicating the brightness of the corresponding pixels of both images obtained from the line sensors 21 and 22 is determined while one or both of said images are shifted, and this sum is taken as a correlation value. The amount of shift of the images when this correlation value is at a minimum indicates the positional deviation between the two images, i. e., (X1+X2). In idealized terms, the distance by which the two images obtained from the line sensors 21 and 22 must be moved in order to cause said images to overlap as shown in FIG. 2 is (X1+X2).

Here, for the sake of simplicity, the image sensors were described as one-dimensional line sensors 21 and 22. However, in one embodiment of the present invention, as will be described below, two-dimensional CCDs or two-dimensional photo-sensor arrays are used as image sensors. In this case, the same correlation calculations as those described above are performed by relatively shifting the two-dimensional images obtained from the two image sensors. The amount of shift at the point where the correlation value reaches a minimum corresponds to (X1+X2).

Figure 3:
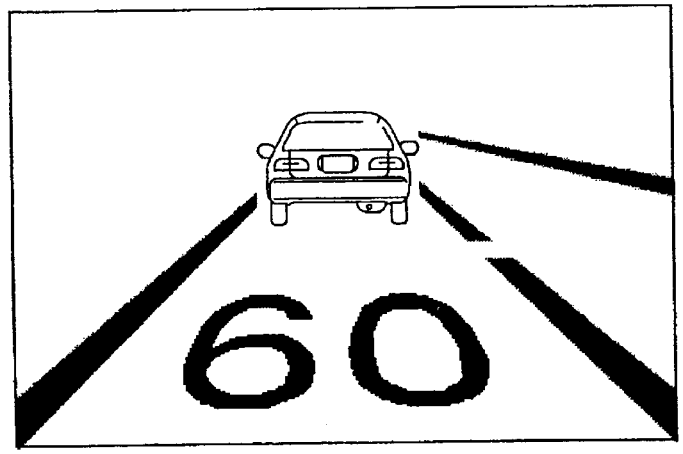
FIG. 3(a) is a diagram showing the image that is captured.
FIG. 3(b) shows the image divided into small areas (windows) for the purpose of judging distances and road areas, in accordance with one embodiment of the present invention.
Figure 3:
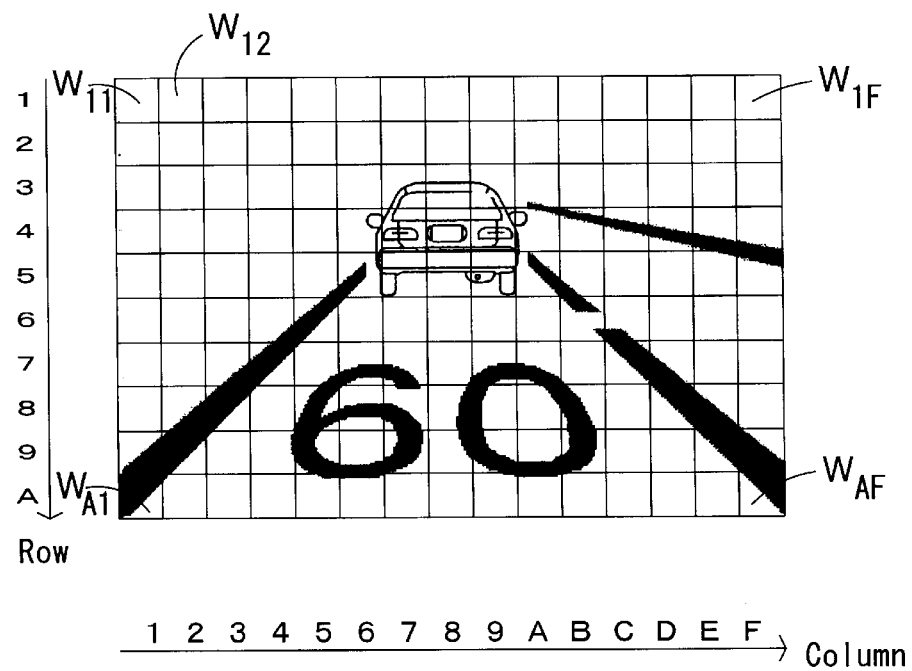

The image sensor 3 shown in FIG. 1 corresponds to one of the image sensor in FIG. 2, consisting of the lens 23 and line sensor 21, and the image sensor 3' corresponds to the other image sensor in FIG. 2, consisting of the lens 24 and line sensor 22. In this embodiment, as is shown in FIG. 3(b), the imaged area is divided into a plurality of windows (small sections) $W_{11}$, $W_{12}$, . . . and distance is measured for each window. Accordingly, a two-dimensional image of the overall object is required. Accordingly, each of the image sensor 3 and 3' is comprised of a two-dimensional CCD array or a two-dimensional photo-sensor array.

FIG. 3(a) shows an example of the image obtained when another vehicle running in front of the vehicle incorporating the system of the present invention is imaged by one of the image sensor 3 or 3'. FIG. 3(b) shows the image in FIG. 3(a) schematically split into a plurality of small sections called windows. FIG. 3(b) has rows in the vertical direction and columns in horizontal direction. For the sake of simplicity, the image is shown splitting into 10 rows×15 columns of windows. Reference numerals are assigned to the respective windows. For example $W_{12}$ indicates the window in row 1, column 2.

Referring to FIG. 1, the images of objects captured by the image sensor 3 and 3' are converted into digital data by analog-digital converters (A/D converters) 4 and 4' and stored in image memories 5 and 5'. The image portions corresponding to the window $W_{11}$ are respectively cut out from the image memories 5 and 5' by a window cutout part 9 and sent to a correlation calculating part 6. The correlation calculating part shifts the two cutout images by a specified unit at a time, and performs the aforementioned correlation calculations. The amount of shift at the point where the correlation value reaches a minimum corresponds to (X1+X2). The correlation calculating part 6 sends the value of (X1+X2) thus determined to a distance calculating part 7.

The distance calculating part 7 determines the distance $a_{11}$ to the object in the window $W_{11}$ using the aforementioned formula: a=B·f/(X1+X2). The distance $a_{11}$ thus determined is stored in a distance memory 8. A similar calculation process is successively performed for respective windows, and the resulting distances $a_{11}$, $a_{12}$, . . . are stored in the distance memory 8. The distance to a captured object calculated for each window is referred to as the measured distance of the window.

In the image data used in the abovementioned correlation calculations, the pitch of the elements in the imaging element array determines the resolution. Accordingly, when a light-receiving element such as a photo-sensor array that has a relatively large pitch is used, it is preferred to enhance the density of the image data by performing calculations involving inter-pitch interpolation. Correlation calculations can be performed for image data whose density has thus been enhanced.

Furthermore, in order to correct for variations in the characteristics of the imaging element array according to temperature, a temperature sensor may be installed in the vicinity of the imaging element array, and the distance calculations are corrected based on temperature information obtained from the temperature sensor.

Referring to FIG. 1, the road surface exclusion part 31 excludes windows that merely show road surface. Such windows showing road surface are identified and deleted by a scheme described in U.S. Pat. No. 6,658,137 which is incorporated herein by reference. Briefly, the system compares predetermined estimated distance of each window to the road surface with the measured distance of corresponding window. The window having a measured distance that is substantially the same as the estimated distance or is substantially larger than the estimated distance is marked as a road area and excluded from object recognition process because such window is not capturing an object on the road surface.

The term "estimated distance" refers to the distance to the road surface when the vehicle is parallel to the road surface. For example, such estimated distances are calculated beforehand based on the attachment positions, installation angles, base line length, focal lengths and size of the image sensor 3 and 3' (realized by means of CCD arrays) and the positions of the windows in the image, and are stored in an estimated distance memory 32.

The measured distance values of windows that have been determined to belong to the road surface may be deleted from the distance memory 8. Alternatively, flags may be set for such windows identifying that the windows belong to the road surface. Such windows with flags may be stored in the distance memory 8.

The vehicle may run along a downhill or uphill slope. The system may be arranged to delete the measured distance values if the result of the comparison with the corresponding estimated distance falls within a specified range. For example, if the difference between the measured distance and the estimated distance is 0.5 m or less, the measured distance value may be deleted. On the other hand, if the difference is greater than 0.5 m, subsequent clustering processing is performed.

A clustering part 33 performs clustering of the windows that are undeleted or identified not to be a part of the road surface by the road surface exclusion part 31. A distance converter 26 converts the measured distances into distance labels for the respective window with reference to a conversion table that is stored in a distance range memory 9. The measured distances are converted into distance labels corresponding to the distance ranges. Viewing field of the image sensors is divided into a plurality of distance ranges and each distance range is associated with a unique distance label. The distance range is smaller as the distance is shorter, and is larger as the distance is larger so as to allow larger tolerance in measuring larger distance.

Figure 7:
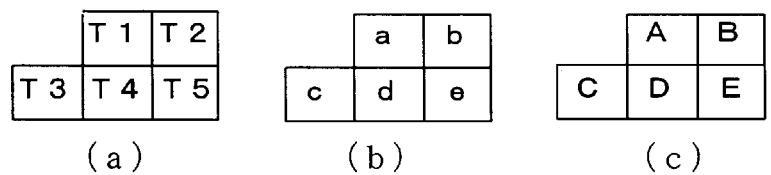
FIG. 7 is a diagram illustrating the template and method of determining cluster labels used in one embodiment of the present invention.

A cluster labeler 27 assigns cluster labels to respective windows based on the relationship of a given window and adjacent windows in terms of the distance labels of the respective windows. Typically, the window immediately to the left of the given window, the window immediately to the right of the given window, the window immediately above the given window and the window immediately at the upper right corner of the given window are chosen for evaluating the relationship. The cluster labeler 27 assigns cluster labels to the given window using a template that defines such relationship. An example of such a template is shown in FIG. 7, which will be described in more details hereafter. Clusters having the same cluster labels form an integral cluster.

A three-dimension converter 35 generates three-dimensional information of the clusters. Typically, the three-dimensional information includes three coordinates, horizontal position (x), vertical position (y) and distance to the road surface (z). The three dimensional information enables analysis of the captured image in x-y plane that is a front plan view of the image and in y-z plane that is a side view of the image.

A recognition unit 200 recognizes physical objects in the captured image based on cluster information thus generated. The unit 100 includes a first recognition part 43 that recognizes physical objects utilizing information on inferred physical objects, which have been generated, by an inference part 40 and stored in an inference memory 49. The unit 200 also includes a second recognition part 44 that recognizes physical objects based on cluster information as processed by a judgment part 37 but without utilizing the information on inferred physical objects.

Distance Range

Figure 4:
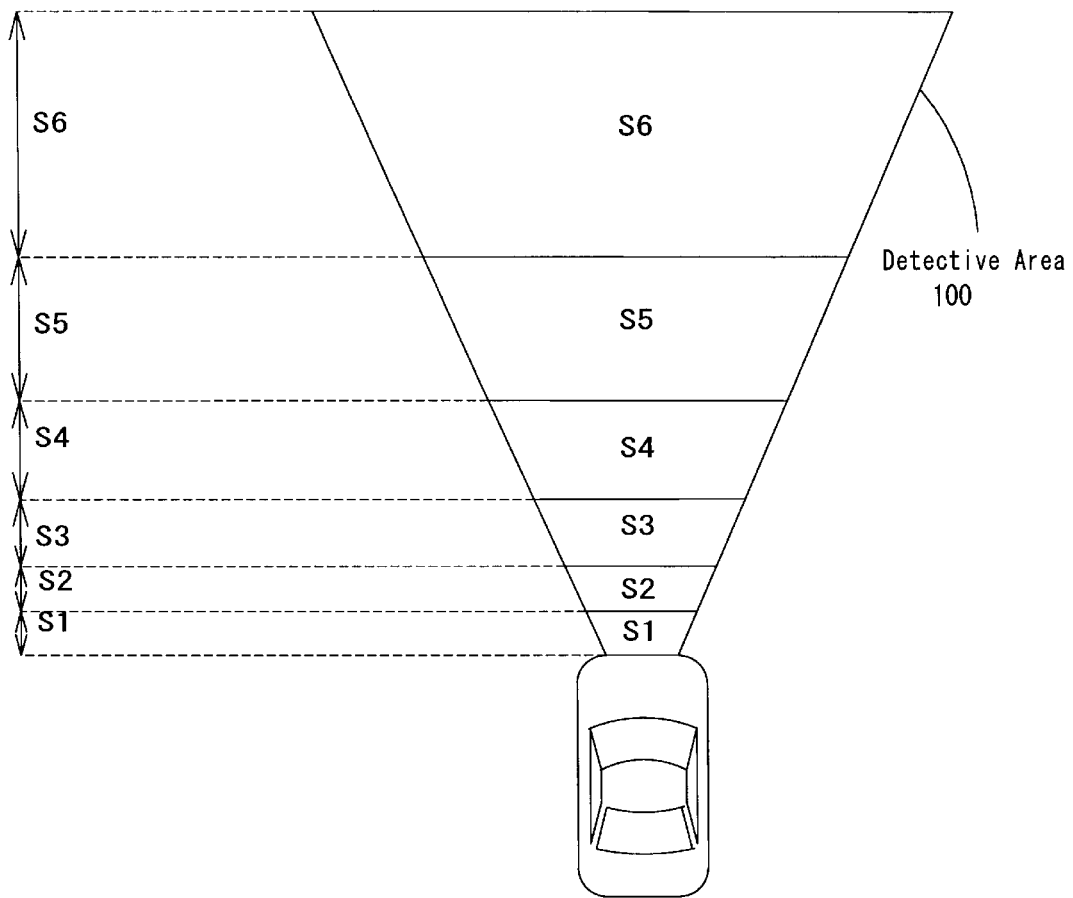
FIG. 4(a) is a diagram showing the division of detection areas.
FIG. 4(b) shows the setting of distance ranges and distance levels, in the present invention.

One example of the detection area 100 is shown in FIG. 4(*a*). The detection area 100 is an area in which distances can be measured by the image sensors 3 and 3'. The area 100 is determined based on the specification and positions of the image sensors 3 and 3'. For example, the detection area 100 can be set with a distance range of 60 meters and an angular range of 30 degrees. Although the detection area 100 can be fixed beforehand, it is desirable to set the detection area 100 dynamically in accordance with the speed of the vehicle. In this case, the detection area 100 is set so that the distance range increases and the angular range decreases with an increase in the speed of the vehicle.

The detection area 100 is divided into a plurality of distance ranges so that there is no overlapping. In this embodiment, the precision of the measured distances drops as the distance from the vehicle equipped with the image sensor 3 and 3' increases. Accordingly, the detection area 100 is divided so that it has wider distance ranges as the distance from the vehicle increases (S1 through S6 in FIG. 4(*a*)).

The distance ranges are set in accordance with the tolerance in the measured distances. Here, the value of the distance tolerance depends on the specifications, etc., of the image sensor 3 and 3'. For example, assuming that the tolerance in the measured distances is 10% or less of the actual distances, the distance range for a certain given distance can be set as "distance~(distance×(1+0.1))". In the present embodiment, because a precision of 10% tolerance may not be insured for all the pixels, the distance ranges are set with the distance tolerance of 30% for high speed processing. Accordingly, the distance range for a certain given distance is set as "distance~(distance×(1+0.3))".

FIG. 5 is a table showing the relationship between distances and the distance labels where the tolerance is set at 30%. Different distance labels are provided to different distance ranges. For example, in the case of a distance of 1 m, 30% of the distance is 0 (values below the decimal point are discarded). Accordingly, the distance label of "1" is assigned to the distance 1 m. In the case of a distance of 2 m, because 30% of the distance is 0, the label of "2" is assigned to the distance 2 m. Likewise, the label of "3" is assigned to distances 3. For the distance 4, because 30% of the distance is 1 m, the label of 4 is assigned to the distance range from 4 m to 4+1=5 m. Likewise, for the distance 6, because 30% of the distance is 1 m, the label of 5 is assigned to the distance range from 6 m to 6+1=7 m.

For the distance 8 m, because 30% of the distance is 2 m, the next label of 6 is assigned to distance range from 8 m to 8+2=10 m. Here, the distance label increments by 1 each time the distance range changes. In the case of a distance of 20 m, 30% of the distance is 6 m. Accordingly, a distance label of "9" is assigned to the distance range of 20 m through 26 m. In this way, the distance ranges are progressively set from short distances to long distances, so that the detection area 100 is divided into a plurality of distance ranges. Alternatively, several distance ranges with different distance labels may be combined to form a single distance range.

In the present embodiment, for the sake of simplicity, several distance ranges shown in FIG. 5 are combined to form larger distance ranges, so that the distance ranges S1 through S6 are set as shown in FIG. 4(*b*), and new distance labels 1 through 6 are respectively assigned to these distance ranges. FIG. 4(*a*) shows the distance ranges S1 through S6 of FIG. 4(*b*). Here, the distance ranges increase in size as the distance from the vehicle increases. Furthermore, other distinguishable symbols such as letter of the alphabet, etc., may also be used as the distance labels. The distance ranges to which distance labels have thus been assigned are stored as a distance conversion table in a distance range memory 9. When the detection area is fixed beforehand, it is desirable that the distance ranges be calculated beforehand, and that a distance conversion table with assigned distance labels be stored beforehand in the distance range memory 9. On the other hand, when the detection area is dynamically updated, the stored distance conversion table can be dynamically updated.

Clustering

Referring to FIG. 1, the clustering part 33 performs clustering of the windows that remain undeleted by the road surface exclusion part 31. First, the distance converter 26 converts the measured distances into distance labels for respective windows. The measured distances of the windows are checked referring to the distance conversion table stored in the distance range memory 9 and converted into the distance labels. Here, in the case of windows for which no measured distance has been obtained because of for example lack of contrast, a label not used in the distance conversion table (for example a label "0") may be assigned. When the distance converter 26 converts the measured distances into distance labels, the distance converter 26 counts and calculates the occurrence degree of the windows in respective distance ranges.

As an example, FIG. 6(*a*) shows the measured distances of respective windows on the image that has been captured. The distance converter 26 converts the measured distances shown in FIG. 6(*a*) into distance labels in accordance with the distance conversion table shown in FIG. 4(*b*). FIG. 6(*b*) shows the distance labels produced by this conversion for the respective windows. Simultaneously with this process, the distance converter 26 counts the number of windows for each distance label and determines the occurrence degree of windows for each distance label.

When the occurrence degree of windows having a certain distance label is less than a certain threshold value after a conversion to distance labels has been performed for all of the windows, the distance converter 26 sets the distance labels to "0". This action is suited for achieving high-speed operation. Specifically, because it is determined that no effective physical object (vehicle running in front, etc.) has been captured in the distance range in question, the distance labels are reset to "0". Different values can be set as the threshold value for each distance range.

In the example shown in FIG. 6(*b*), windows with a distance label of "1" consist only of the single window W31, and windows with a distance label of "2" consist of the five windows W53, W73, W66, W68 and W48. If the threshold value for the distance labels "1" and "2" is set at for example "10", the distance labels of these windows are replaced with "0". The distance labels obtained as a result are shown in FIG. 6(c).

Cluster Label

Referring to FIG. 1, the cluster labeler 27 assigns cluster labels to the respective windows based on the distance labels, and windows that have the same labels are formed into an integral cluster. The cluster labels are assigned so that adjacent windows that have the same distance labels form parts of the same cluster.

The cluster labeler 27 assigns cluster labels to the windows using the template shown in FIG. 7. T1 through T5 in FIG. 7(a) indicate positions in the template. "a" through "e" in FIG. 7(b) indicate the distance labels of windows respectively corresponding to the positions T1 through T5 when the template is positioned so that T4 assumes the place of a window to be processed. "A" through "E" in FIG. 7(c) indicate the cluster labels assigned to windows respectively corresponding to the positions T1 through T5.

The table in FIG. 7(d) shows the type of cluster label D that is assigned to the window at position T4 based on the distance labels for the windows at positions T1 through T5 when T4 is placed at the window to be processed. For example, if the distance labels "a" through "e" at positions T1 through T5 satisfy condition 5 in FIG. 7(d), then a cluster label B is assigned to the window at T4. The cluster label "L" is assigned when conditions 2 or 3 is satisfied requiring a new cluster label. The cluster labeler 27 successively scans the windows on the image placing T4 of the template at respective windows on the image, thus assigning cluster label D to respective windows. The table of FIG. 7(d) shows the cluster labels given to respective windows in accordance with the above described scheme and additional scheme to be described below.

Referring to FIG. 8, respective windows are identified in terms of W11 through W44 as shown in the table in FIG. 8(f). The measured distances of the windows have been converted into distance labels as shown in FIG. 8(a) by the distance converter 26. The cluster labeler 27 scans the windows from the upper left to the lower right. Since the distance label of the window W11 is "0", condition 1 of the table in FIG. 7(d) is satisfied, and a cluster label of "0" is assigned to the window W11. Similarly, the cluster label of "0" is assigned to each of the windows W12 through W14 and W21.

The window 22 that has a distance label "6" satisfies condition 2 of the table in FIG. 7(d), and a new cluster label "61" is assigned (FIG. 8 (b)). In this example, the cluster label is expressed by two digits. The higher digit indicates the distance label and the lower digit indicates occurrence number of windows having the same distance label. The second digit is incremented by one each time conditions 2 or 3 of the table in FIG. 7(d) is satisfied for the window having the same distance label. Any symbols such as numerals and alphabetic characters may also be used as the cluster labels.

Next, the template is placed to align T4 with the window W23. Here, since the window W23 satisfies condition 4 of the table in FIG. 7(d), the same cluster label as that of window W22, i. e., the cluster label "61", is assigned to the window W23 (FIG. 8(c)). Since the windows W24 and W31 satisfy condition 1, a cluster label of "0" is assigned to these windows. The window W32 satisfies condition 6 of the table in FIG. 7(d), and the same cluster label as that of the window W22, i. e., the cluster label "61" is assigned to the window W32 (FIG. 8(d)). The window W33 satisfies condition 7 of the table in FIG. 7(d), the same cluster label as that of the window W23, i. e., the cluster label "61", is assigned to the window W33. The rest of the windows W34 and W41 through W44 satisfy condition 1, and cluster label of "0" are assigned to these windows. In this way, cluster labels are given as shown in FIG. 8(e).

For the template shown in FIG. 7(a), the windows are scanned from the upper left to the lower right. The template shown in FIG. 7 is an example. It would also be possible to use other templates, where the order of scanning of the windows may be set in accordance with the template.

Cluster Linkage

When condition 8 of the table in FIG. 7(d) is satisfied, the cluster labeler 27 links the cluster labels at T1 and T3 of the template, and stores these linked cluster labels in the cluster memory 48. This linkage will be described with reference to FIG. 9. The windows in the example are identified by W11 through W35 as illustrated in FIG. 9(g). FIG. 9(a) shows the distance labels of respective windows W11 through W35, which have been given by the distance converter 26.

Referring to FIG. 1, the cluster labeler 27 moves the template across the window on the image from the upper left to the lower right and assigns cluster labels to the windows based on the distance labels in FIG. 9(a) by the same method as that illustrated in FIG. 8. The windows W11 through W15, W21 through W23 satisfy condition 1, and cluster labels of "0" are assigned to these windows. Since the window W24 satisfies condition 2 in FIG. 7(d) and this is the first occurrence of a window having the distance label of 6, a new cluster label of "61" is assigned to this window as shown in FIG. 9(b). Since the windows W25 and W31 satisfy condition 1, cluster labels of "0" are assigned to these windows. Window W32 satisfies condition 2 and this is the second occurrence of a window having the distance label of 6, a new cluster label of "62" is assigned (FIG. 9(c)). Since the windows W33 satisfies condition 4, cluster label of "62" which is the same as that of the window W32 is assigned (FIG. 9(d)).

Window W34 satisfies condition 8 of the table in FIG. 7(d), and a cluster label of "61" which is the same as that of the window W24 is assigned to window W34 (FIG. 9(e)). As a result, the cluster labels of the windows W32 and W33 are different from the cluster labels of the windows W24 and W34, despite that the windows are adjacent to each other.

When condition 8 of the table in FIG. 7(d) is satisfied, the cluster labels corresponding to A and C of the template are linked. The cluster labels "62" and "61" of windows W33 and W24 in this example are linked and stored in the cluster memory 48 as an integral cluster. After cluster labels have been assigned to all of the windows, the same cluster label replaces the two cluster labels stored in linked form. For example, the cluster label "62" may be replaced by "61" or vice-versa. Furthermore, for example, "61" and "62" may be replaced by a new cluster label "63". FIG. 9(f) shows cluster labels thus assigned to respective windows.

Returning to FIG. 6, when cluster labels are assigned to windows based on the distance labels shown in FIG. 6(c) in accordance with the method described above, a cluster label distribution as shown in FIG. 6(d) is obtained. Windows with the same cluster labels collectively form an integral cluster. The clusters thus determined are shown in FIG. 6(e).

By using distance labels instead of handling the measured distance values themselves, clustering of windows can be carried out at a high speed. Specifically, in the present invention, the conversion of measured distance values into distance labels is performed in parallel with the determination of the occurrence degree distribution or frequency distribution of each distance range. Thus, a determination as to which distance range the measured values of windows belong to is inherently performed. By setting the distance ranges based on tolerance in the measured distances, accuracy and speed of clustering is enhanced.

Three-dimensional Data

Figure 10:
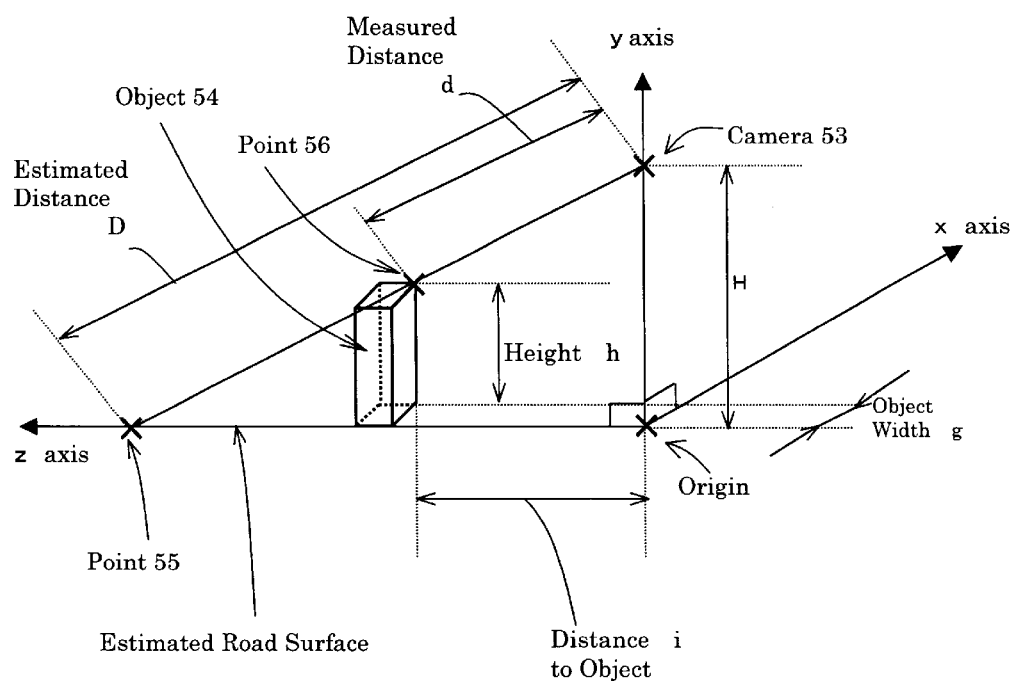
FIG. 10 is a diagram illustrating the method used to express windows as three-dimensional information.

Referring to FIG. 1, three-dimension converter 35 generates three-dimensional data of the clusters. As shown in FIG. 10, the three-dimensional information includes three coordinates in the present embodiment, i. e., horizontal position (x), vertical position (y) and road surface distance (z). The "x" coordinate expressing the horizontal position corresponds to the direction in which the columns of the windows are lined up (see FIG. 3(b)). The "y" coordinates that expresses the vertical position corresponds to the direction of height from the road surface. The z coordinate indicating the distance of the road surface corresponds to the direction in which the rows of the windows are lined up (see FIG. 3(b)). The "z" coordinate is proportional to the measured distance "d".

The origin O indicates that point of the road surface where the vehicle is located. The "x", "y" and "z" axes intersect at right angles at the origin O. The "x" axis extends to the left and right as seen from the vehicle. The "y" axis extends in the direction perpendicular to the road surface and the "z" axis in the direction of advance of the vehicle. The imaging camera 53 is located at a height "H" in the direction of the "y" axis from the origin O. The physical object 54 has a height "h" and a width of "g", and is located at a distance "i" in the direction of the "z" axis. If the physical object 54 is not present, then the point 55 on the road surface is included in the image captured by the imaging camera 53. If the physical object 54 is present on the road, the window that would include the image of point 55 will include a point 56 of the physical object instead of the image of point 55 of the road surface. The estimated distance "D" is the distance between the imaging camera 53 and the point 55 on the road surface. When no physical object 54 is present, this estimated distance "D" is equal to the measured distance to the captured point 55. In FIG. 10, the measured distance "d" is the distance from the imaging camera 53 to the point 56 of the physical object 54, which is calculated by the method described above with reference to FIG. 2. In the (x, y, z) coordinate system, the position of the imaging camera 53 is (O, H, O) and the position of point 56 is (g, h, i).

Since the estimated distance "D" for each window and the height "H" of the imaging camera from the estimated road surface are fixed values, they can be calculated beforehand and stored. As is clear from FIG. 10, the height "h" of the object can be determined from the following equation (1), and distance "i" to the object 54 can be determined from the following equation (2).

$$h=(D-d)\times H/D \quad (1)$$

$$i=\sqrt{d^2-(H-h)^2} \quad (2)$$

The horizontal distance from the vehicle that is the distance in the "x" axis in FIG. 10 is determined beforehand for location of windows based on the position of the imaging camera. For example, the third row and the third column of windows indicates positions 1 meter to the left from the center of the vehicle. Accordingly, the value of the "x" coordinate of point 56 (in the present example, this is g, and is equal to the value of the width of the object of imaging) can be determined based on the position of the window that includes point 56. Thus, the respective windows forming clusters can be expressed in terms of x, y and z coordinates. In another embodiment, it would also be possible to use (for example) the measured distance "d" instead of the "z" coordinate indicating the road surface distance, and windows could also be expressed using a different coordinate system from the coordinate system described above.

Thus, the three-dimension converter 35 represents the clusters in three-dimension and projects the image in three dimensions. Preferably a minimum rectangular parallelepiped that contains all of the points of a given cluster projected in three dimensions be determined, and the cluster be approximated by such a rectangular parallelepiped. In this way, the center position, width and height of the object can be determined and accurately recognized.

If the abovementioned x, y, z coordinate system is used, the width of each cluster approximated by a rectangular parallelepiped is the value obtained by subtracting the minimum "x" coordinate value from the maximum "x" coordinate value of the captured points, and the thickness of the cluster is the value obtained by subtracting the minimum "y" coordinate value from the maximum "y" coordinate value of the captured points. Furthermore, the center position of each cluster is expressed as a value obtained by subtracting the minimum value from the maximum value for each of the x, y and z coordinates and halving the result. The distance of the center position, the horizontal position and vertical position, and the cluster height and width (cluster attributes) of each cluster thus calculated are stored in the cluster memory 48.

Cluster Group

Returning now to FIG. 1, cluster grouping part 36 fetches clusters from the cluster memory 48 and determines cluster groups based on the cluster attributes. A "process completion" flag is set for the cluster that has thus been processed. At first, none of the clusters has a "process completion" flag set. Accordingly, all of the clusters are fetched and processed.

In the present embodiment, the cluster grouping part 36 compares the distances between a given cluster and other clusters as well as the differences in the horizontal positions and vertical positions of the clusters. If the differences are all equal to or less than certain threshold values, the cluster grouping part 36 combines such clusters into a cluster group. This process is performed for all of the fetched clusters. When a plurality of clusters is positioned close to each other, there is a high probability that they belong to the same object.

It is preferred that different threshold values be used according to distance from the vehicle. In the present embodiment, the threshold values are set in accordance with the distance of the two clusters whose differences in position and distance are to be determined. The distance of the two clusters is calculated based on the number of windows included in respective clusters and the measured distances of such windows. For example, assume that the image includes two clusters C1 and C2, the respective distances of the clusters C1 and C2 from the vehicle are d1 and d2 and the numbers of windows included in the clusters C1 and C2 are w1 and w2 respectively. The distance of the two clusters from the vehicle can be calculated using the following equation (3). Here, values obtained by averaging the measured distances of the windows contained in the respective clusters are used as the distances d1 and d2 of the clusters.

$$\text{Distance of two clusters}=(d1\times w1+d2\times w2)/(w1\times w2) \quad (3)$$

Figure 11:
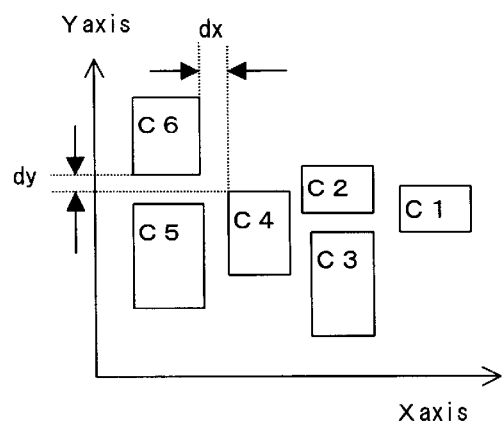
FIG. 11(a) is a diagram showings clusters as seen from the x-y plane.
FIG. 11(b) is a diagram showing the clusters as seen from the x-z plane.
FIG. 11(c) is a diagram showing cluster groups as seen from the x-y plane.
FIG. 11(d) is a diagram showing cluster groups as seen from the x-z plane.
Figure 11:
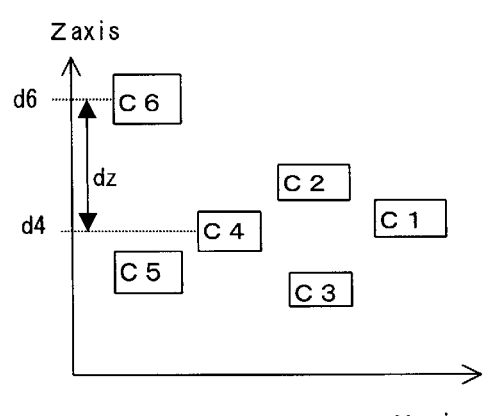
Figure 11:
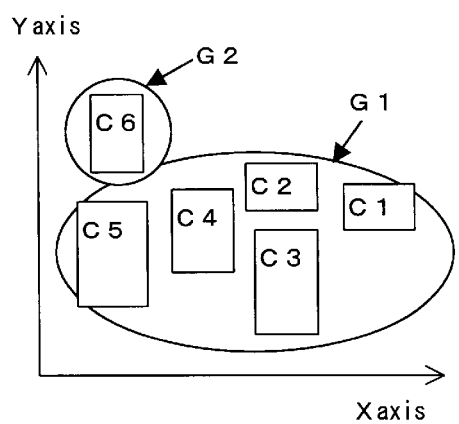
Figure 11:
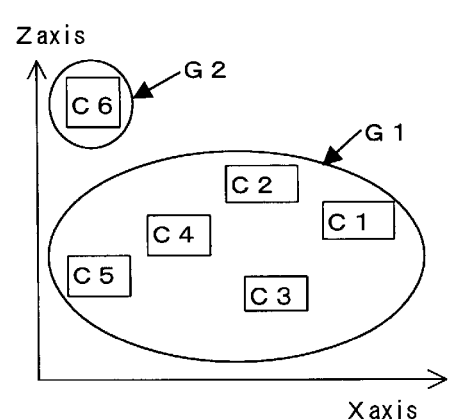

The differences dx and dy in the horizontal positions and vertical positions of the two clusters are expressed as the spacing of the two clusters, and the difference in distance dz is expressed as the difference in the distances of the respective clusters (d1 and d2 in the above description). For example, FIG. 11(a) shows a plurality of clusters as seen from the x-y plane, and FIG. 11(b) shows the same clusters as those in FIG. 11(a), as seen from the x-z plane. The difference in the horizontal positions of the clusters C4 and C6 is expressed by dx in the direction of the "x" axis, and the difference in the vertical positions is expressed by dy in the direction of the "y" axis. If the distances of the clusters C4 and C6 from the vehicle are respectively d4 and d6, then the difference in distance is expressed by dz in the direction of the z axis.

Based on the distance of the two clusters from the vehicle calculated using the above equation (3), the threshold value can be set for example as shown in Table 1 below relative to the difference in distance between the clusters, and as shown in Table 2 below for the differences in horizontal positions and vertical positions of the two clusters.

TABLE 1

| Distance of two clusters (meters) | Threshold value of difference in distance dz (meters) |
| --- | --- |
| 0~14.9 | 3.0 |
| 15.0~29.9 | 5.0 |
| 30.0~ | 8.0 |

TABLE 2

| Distance of two clusters (meters) | Threshold value of differences in horizontal/vertical positions (dx and dy) (meters) |
| --- | --- |
| 0~5.9 | 1.0 |
| 6~ | 0.6 |

Larger threshold values are used as the distance from the vehicle is larger because the tolerance in the measured distance is larger as the object is positioned further from the vehicle. Larger threshold value is used for the differences in the horizontal and vertical positions as the distance between the two clusters becomes smaller as shown in Table 2. This is because when for example a physical object is at a short distance from the vehicle mounting the system, the contrast of the captured image may be too low to calculate the distance from the vehicle with respect to each window, which results in drop-out of a number of windows which in turn generates a larger spacing between the clusters.

Referring now to FIGS. 11(a) and 11(b), the cluster grouping part 36 selects two clusters from the clusters C1 through C6, calculates the differences in distances from the vehicle, horizontal positions and vertical positions, and judges whether or not the two clusters should be included in a same cluster group. For example, in the case of the clusters C1 and C2, the differences in distance from the vehicle and positions are equal to or less than the respective threshold values so that the clusters C1 and C2 are included in a same cluster group. Differences in distance from the vehicle and positions are also equal to or less than the respective threshold values in the case of the clusters C2 and C4. Thus, the clusters C2 and C4 are also included in the same cluster group. As a result, it is determined that the clusters C1, C2 and C4 can be included in the same cluster group G1.

On the other hand, in the case of the clusters C6 and C5, the differences in the horizontal and vertical positions are equal to or less than the threshold value, but the difference in distance from the vehicle exceeds the threshold value. Accordingly, it is determined that these clusters belong to different cluster groups. Thus, the cluster grouping part 36 determines two cluster groups G1 and G2 as shown in FIGS. 11(c) and 11(d). The cluster grouping part 36 assigns the same cluster labels to clusters that belong to the same cluster groups.

Inference of Physical Object

Figure 12:
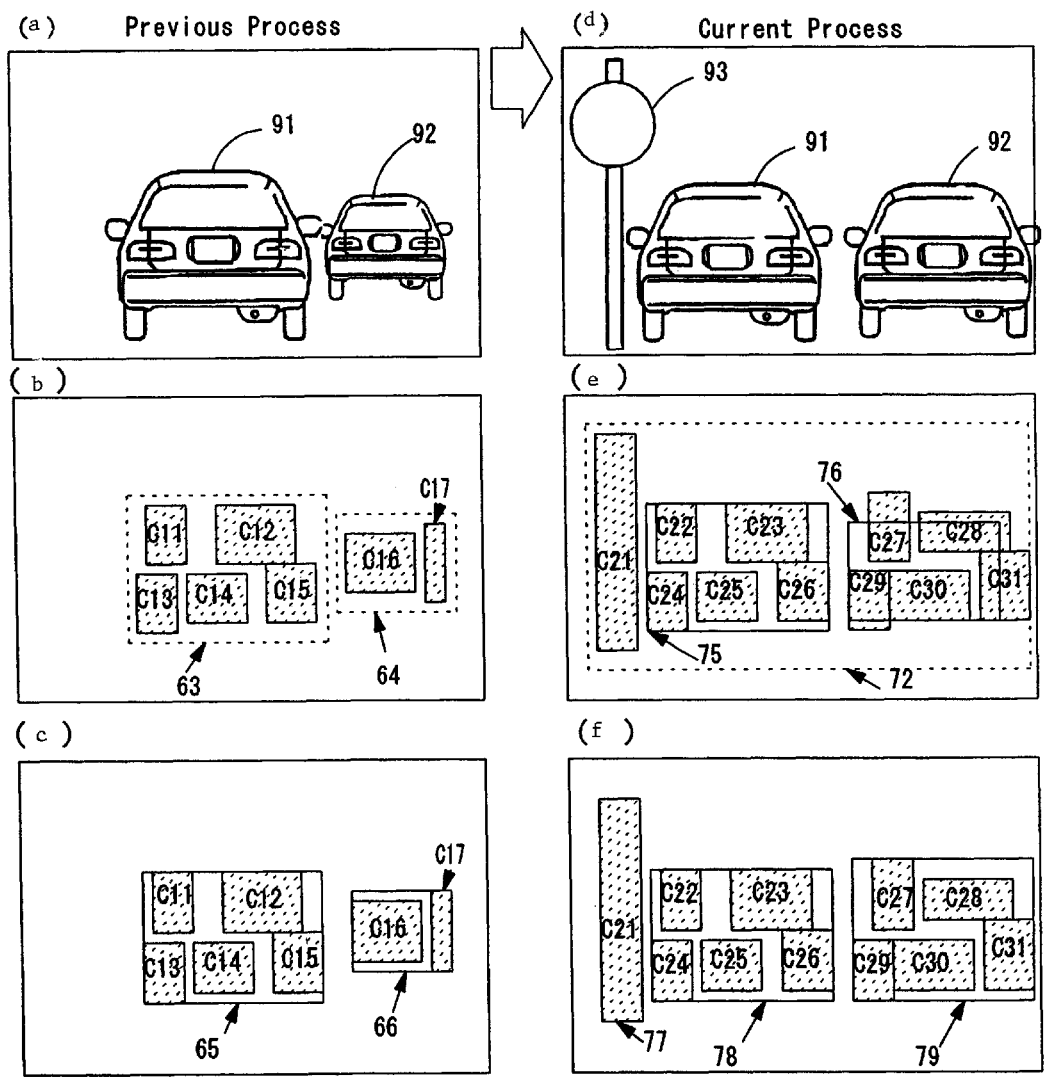
FIG. 12(a) is a diagram showing previously captured image.
FIG. 12(b) is a diagram showing clusters.
FIG. 12(c) is a diagram showing recognized physical objects in one embodiment of the present invention.
FIG. 12(d) is a diagram showing currently captured image.
FIG. 12(e) is a diagram showing physical objects 75 and 76 obtained by inference from the physical objects 65 and 66.
FIG. 12(f) is a diagram showing recognized physical objects 77, 78, and 79 which correspond to traffic sign 93, a car 91 and another car 92 respectively.
Figure 14:
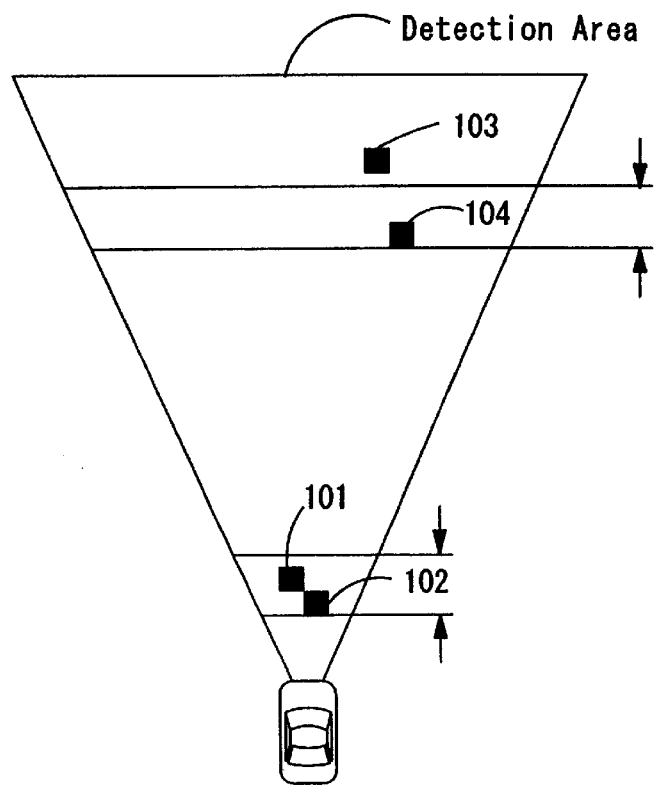
FIG. 14 is a diagram showing the relationship between clustering and the setting of distance ranges in the detection area in the prior art.
Figure 14:
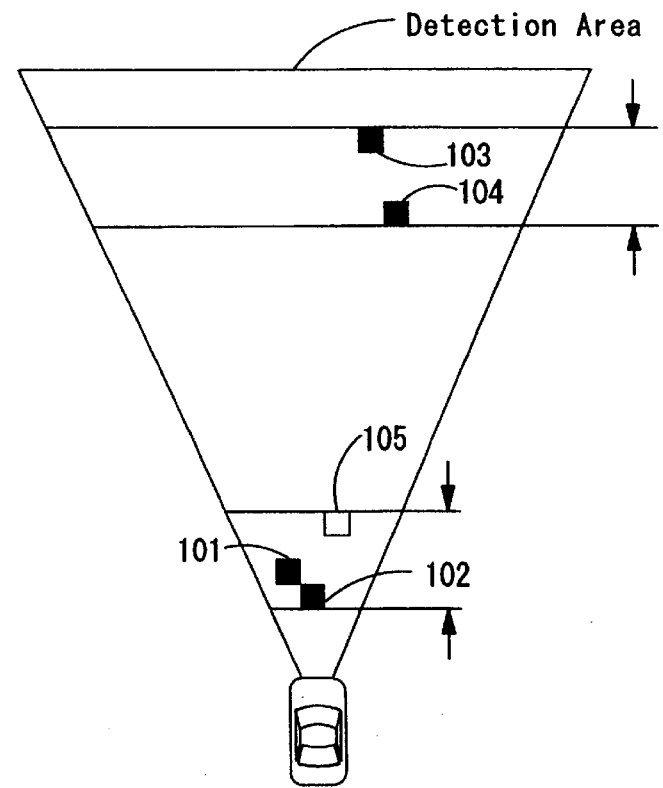

Referring to FIG. 1, physical object inferring part 40 infers the positions of physical objects in the currently obtained image based on the positions of previously recognized physical objects and the relative speed with respect to the physical objects. The scheme used to infer physical objects in this embodiment will be described with reference to FIG. 12. FIGS. 12(a) through 12(c) show a previous processing, and FIGS. 12(d) through 12(f) show the current processing. In FIG. 12(a), two vehicles 91 and 92 are captured, while in FIG. 12(d), the same vehicles 91 and 92 as those in FIG. 12(a) as well as a sign 93 are captured.

FIG. 12(b) shows clusters C11 through C17 determined by the clustering part 33 which are grouped into cluster groups 63 and 64 by the cluster grouping part 36 based on the captured image shown in FIG. 12(a). FIG. 12(c) shows physical objects 65 and 66 recognized from the cluster groups 63 and 64, which correspond to the vehicle 91 and vehicle 92 respectively. The positions and sizes of the physical objects 65 and 66 are stored in a physical object memory 39 in the previous process.

The physical object inference part 40 reads out the positions and relative speeds of the previously recognized physical objects 65 and 66 from the physical object memory 39, and calculates the current positions of the physical objects 65 and 66. This calculation can be performed using the calculation formula:

(position of previous physical object+relative speed×detection time interval)

In this example, the relative speed with respect to the physical object 65 is assumed to be zero, the relative speed with respect to the physical object 66 is assumed to be −10 kilometers per hour (in this example, when the speed of the vehicle mounting the system is greater than the speed of a physical object the relative speed is expressed as "minus"), and the detection time interval is assumed to be 100 milliseconds. The relative distance to the physical object 65 is unchanged between the previous detection and the current detection, and the relative distance to the physical object 66 is shortened by 0.3 meters.

Assuming the previous position of the physical object 65 expressed in terms of the center coordinates is (x1, y1, z1) and the position of the physical object 66 is (x2, y2, z2) with the position of the vehicle mounting the system being the origin and the respective coordinate values expressed in meters, the current position of the physical object 65 can be estimated as (x1, y1, z1), and the current position of the physical object 66 can be estimated as (x2, y2, z2−0.3). Here, it is considered that estimated physical objects are in the same horizontal positions as in the previous detection. In accordance with the coordinate system and origin used, the relative speed in case the speed of the vehicle mounting the system is larger or smaller relative to the physical object can be expressed in terms of "positive" or "negative". The positions of the physical objects may be calculated using a system other than that described above.

The physical object inferring part 40 can read out the width and height of the physical objects 65 and 66 from the physical object memory 39 and reconstruct the physical objects 65 and 66 in three dimensions in their respective current positions (x1, y1, z1) and (x2, y2, z2−0.3). The positions of the clusters in the images of the inferred physical objects can be determined. FIG. 12(e) shows physical objects 75 and 76, obtained by inferring the physical objects 65 and 66 as described above.

The physical object inferring part 40 stores the attributes (information concerning the physical objects such as distances, horizontal positions, vertical positions, widths and heights, etc.) of the inferred physical objects (hereafter referred to as "inferred physical objects") 75 and 76 in the inferred object memory 49. Furthermore, the process performed by the physical object inferring part 49 may be carried out in parallel with the process performed by the clustering part 33 and cluster grouping part 36.

Cluster Selection

Returning now to FIG. 1, the cluster selection part 41 selects the cluster group that includes a cluster located at the shortest distance from the vehicle. An inferred physical object that has a distance from the vehicle whose difference from that of the cluster in the selected cluster group is within the threshold value and that has overlapping in the horizontal and vertical positions with the selected cluster group is selected from the inferred physical objects stored in memory 49. The cluster selection part 41 selects all of the clusters from the selected cluster group that overlaps with the selected inferred physical object.

Here, in case none of the clusters of the selected cluster group satisfy the distance difference conditions or in case no clusters have overlapping with the inferred objects stored in memory 49, all the clusters included in the selected cluster group are transferred to candidate generating part 42. Inferred physical objects that have no correspondence with the current clusters may be deleted from memory 49 because such physical objects no longer appear in the captured image. Process begins from the cluster groups and the inferred physical objects located at shortest distance from the vehicle because physical objects near the vehicle needs to be recognized at highest priority.

In regard to respective distances of the clusters and the inferred physical objects from the vehicle, the distances at respective center positions of such clusters and inferred physical objects may be used. Alternatively, values obtained by averaging the measured distances of windows forming clusters can be used as the respective distances of the respective clusters. The values shown in Table 1 above can be used as the threshold values for the differences in distance, or different threshold values may be used. The judgment of overlapping can readily be accomplished by projecting the clusters and inferred physical objects being compared onto the x-y plane, thus determining overlapping in the horizontal and vertical positions. An entire cluster may not be included in the inferred physical objects.

In the example shown in FIG. 12, it is assumed that the vehicles 91 and 92 and a traffic sign 93 shown in FIG. 12(d) are actually located at substantially the same distance from the vehicle. FIG. 12(e) shows the clusters C21 through C31 as determined by the clustering part 33 based on the captured image shown in FIG. 12(d). A single cluster group 72 comprising the clusters C21 through C31 is determined by the cluster grouping part 36.

The cluster selection part 41 selects cluster groups that include clusters located nearest to the vehicle. In this example, since there is only a single cluster group, the cluster group 72 is selected. Next, the distances and positions of the clusters forming the cluster group 72 are read from the cluster memory 48. The distances and positions of the of the inferred physical objects 75 and 76 are read from the inferred physical object memory 49. There are two inferred physical objects (i. e., the inferred physical objects 75 and 76), which show overlapping in the horizontal and vertical positions and have distance from the vehicle whose difference from the clusters of the cluster group 72 is smaller than the threshold value. Assuming that the inferred physical object 75 is located nearer to the vehicle than the inferred physical object 76, the inferred physical object 75 is selected. Next, the clusters C22 through C26 are selected which overlap with the inferred physical object 75 among the clusters of the cluster group 72. Thus, the clusters corresponding to inferred physical objects are selected as a group.

Combined Clusters

The candidate generating part 42 studies all possible combinations of the clusters selected by the cluster selection part 41, and determines a combination of clusters as candidates for a physical object. The combinations may include a combination comprising a single cluster. FIG. 13 is a table showing all possible combinations of the clusters C22 through C26 selected for the inferred physical object 75 in FIG. 12(e). For example, in combined cluster No. 10 in FIG. 13, combination of the clusters C23 and C24 is indicated. Here, it is preferred that the minimum rectangular parallelepiped including all the clusters forming combined clusters be determined, and that the combined cluster be approximated by this rectangular parallelepiped. In this way, the attributes of combined clusters (distance, position, size, etc.) can readily be determined.

After the combined clusters constituting candidates for a physical object have been generated by the candidate generating part 42, the process proceeds to a first recognition part 43 via a judging part 37 when combined clusters have an corresponding inferred physical object, and the process proceeds to a second recognition part 44 via the judging part 37 when combined clusters do not have a corresponding inferred physical object.

The judging part 37 in FIG. 1 determines whether or not the object of imaging of clusters is a physical object based on the height or thickness of the combined clusters generated by the candidate generating part 42. The height and thickness of the combined clusters are stored in the cluster memory 48. For example, in case the object to be detected is a vehicle, a corresponding combined cluster at the given distance would be 90 cm high from the estimated road surface, and the difference between the upper surface and the lower surface of the combined cluster would be 80 cm or less. Accordingly, combined clusters whose height from the road surface to the upper surface is 70 cm or less is determined to be not a vehicle. By providing such threshold values for height and thickness, combined clusters belonging to the road surface may be deleted so that it will not be erroneously determined to be a physical object Object Recognition The first recognition part 43 successively compares the attributes of combined clusters which have corresponding inferred physical objects with the attributes of the inferred physical objects. The recognition part 43 recognizes the combined clusters that have attributes closest to the attributes of the inferred physical objects as physical objects. Here, the attributes used are distance, horizontal position, vertical position, width and height, and the comparison of attributes is accomplished using the following Equation (4). The meanings of the variables in Equation (4) are shown in Table 3.

$$E1 = \sqrt{\frac{(Xc - Xt)^2 + (Yc - Yt)^2 +}{(Zc - Zt)^2 / C \cdot Zt + |Wc - Wt| + |Hc - Ht|}} \quad (4)$$

TABLE 3

| | |
|---|---|
| E1 | Functional value expressing difference in attributes between combined clusters and an inferred physical object |
| Xc | x coordinate of horizontal center position of combined clusters |
| Yc | y coordinate of vertical center position of combined clusters |
| Zc | z coordinate indicating distance of combined clusters |
| Wc | Width of combined clusters |
| Hc | Height of combined clusters |
| Xt | x coordinate of horizontal center position of an inferred physical object |
| Yt | y coordinate of vertical center position of an inferred physical object |
| Zt | z coordinate indicating distance of an inferred physical object |
| Wt | Width of an inferred physical object |
| Ht | Height of inferred physical object |
| C | Constant |

Equation (4) expresses the differences between combined clusters and an inferred physical object as a function of the difference in the center position of combined clusters and an inferred physical object and difference in width and height of combined clusters and an inferred physical object. The distance (Z value) has a tolerance according to the distance value, and is corrected by a value proportional to the distance Zt of the inferred physical object.

In the example shown in FIG. 13, functional values E1 (e01, e02, ... e31) are calculated for all of the combined clusters 1 through 31 corresponding to the inferred physical object 75. Joint cluster 31 with the smallest functional value E1 is recognized as the physical object 78 (FIG. 12(f)). Joint cluster 31 having the smallest E1 best matches the position and size of the inferred physical object 75.

In cases where for example a certain cluster overlaps with a plurality of inferred physical objects and thus represents only portions of the inferred physical objects, such a cluster may be excluded from combined clusters. The clusters C22 through C26 and the inferred physical object 75 are stored in the cluster memory 48 and estimate physical object memory 49 respectively, and a "process completed" flag is set.

The process performed by the cluster grouping part 36, cluster selection part 41, candidate generating part 42 and first and second recognition part 43 and 44 is repeated until all the clusters are processed and "processing completed" flags are set. Specifically, the cluster grouping part 36 checks the "processing completed" flags of the clusters stored in the cluster memory 48, and when all clusters are given the "processing completed" flags, the process completes. Alternatively, it would also be possible to arrange the system so that an upper limit (e. g., 4) is set beforehand on the number of objects to be recognized as physical objects, and repetition of the recognition process completes when the number of recognized physical objects reaches this number.

As mentioned above with reference to FIG. 12(f), after the physical object 78 has been recognized, the cluster grouping part 36 checks the "processing completed" flags of the clusters stored in the cluster memory 48 and fetches cluster C21 and clusters C27 through C31 for which no "processing completed" flags have been set. The cluster grouping part 36 checks the "processing completed" flags of the inferred physical objects stored in the inferred physical object memory 49, and extracts the inferred physical object 76 for which no "processing completed" flag has been set.

Since the difference in the horizontal positions of the cluster C21 and those of the clusters C27 through C31 exceed the threshold value, the cluster grouping part 36 generates two different cluster groups. Assuming that the cluster group formed from the clusters C27 through C31 is nearer to the vehicle, the cluster selection part 41 first selects the cluster group consisting of the clusters C27 through C31, and selects inferred physical object 76, whose distance from the vehicle is substantially the same as that of the cluster group C27 through C31. "Substantially the same" means that the difference in the distance is smaller than than the threshold value. Note that the inferred physical object 76 partially overlaps in the horizontal and vertical positions with the cluster group C27 through C31. The clusters C27 through C31 that overlaps with the inferred physical object 76 are selected among the clusters forming the cluster group.

The candidate generating part 42 determines combined clusters from combinations of the clusters C27 through C31. The first recognition part 43 compares the attributes of the respective combined clusters with the attributes of the inferred physical object 76. As a result, the combined cluster consisting of the clusters C27 through C31 is determined to have attributes that are the closest to those of the inferred physical object 76 so that the combined cluster consisting of the clusters C27 through C31 is recognized as a physical object 79 (FIG. 12(f)). The clusters C27 through C31 recognized as a physical object and the corresponding inferred physical object 76 are stored with "processing completed" flags in the cluster memory 48 and inferred physical object memory 49 respectively.

Next, the cluster grouping part 36 fetches from the cluster memory 48 the cluster C21 for which no "processing completed" flag has been set. Since this is a single cluster, the cluster C21 is treated as a cluster group. In this example, all the inferred physical objects have been processed so that there is no corresponding inferred physical object to be compared. Accordingly, the cluster selection part 41 selects the cluster C21 and transfers it to the candidate generating part 42. The candidate generating part 42 determines combined clusters from combinations of all of the clusters contained in a cluster group. Since the cluster C21 is a single cluster, C21 is treated as a combined cluster. The combined cluster consisting of cluster C21 is processed by the second recognition part 44 via the judging part 37.

Clusters representing physical objects are thus viewed in groups. Thus, repetition of the process starts with the determination of cluster groups. As described above, the distances and positions of inferred physical objects are determined based on the relative speed. Accordingly, the values used include a certain amount of tolerance. If clusters that overlaps with inferred physical objects are extracted without determining cluster groups, clusters whose horizontal positions are far from each other may be combined and may erroneously be recognized as a physical object.

The second recognition part 44 receives combined clusters from the candidate generating part 42 which comprise one or more clusters that do not have a corresponding inferred physical object, and compares their attributes with the attributes of predetermined physical objects that are to be detected. The recognition part 44 recognizes that one of the predetermined physical objects which has the smallest difference in the attributes as the physical object corresponding to the combined clusters. It is also possible to use threshold values for deciding that the predetermined physical object whose attributes differ to a small extent such that the difference is smaller than the threshold value represents the physical object. This comparison with predetermined physical objects is performed for all of the combined clusters.

The attributes of the predetermined physical objects are predetermined and are stored in a physical object memory 50. For example, if the objects to be detected include vehicles, the attributes of several types of vehicles are stored, and if the objects to be detected include traffic signs, the attributes of several types of traffic signs are stored. In this embodiment, width and height are used as the attributes that are compared. Distance, horizontal position and vertical position are not compared. Equation (5) shown below is used for the comparison of attributes. The meanings of the variables in Equation (5) are shown in Table 4. Equation (5) expresses the difference in attributes of combined clusters and a predetermined object as a function based on difference in width and height of combined clusters and a predetermined object.

$$E2=|Wc-Wt|+|Hc-Ht| \quad (5)$$

TABLE 4

| | |
|---|---|
| E2 | Functional value expressing difference in the attributes of combined clusters and a predetermined physical |
| Wc | Width of combined clusters |
| Hc | Height of combined clusters |
| Wt | Width of a predetermined physical object |
| Ht | Height of a predetermined physical object |

In the example shown in FIG. 12, as described above the second recognition part 44 compares the attributes of the combined cluster consisting of the cluster C21 extracted by the candidate generating part 42 with the attributes of several predetermined physical objects to be detected, and determines the predetermined object to be detected that has the smallest functional value E2. Thus, the cluster C21 is recognized as a physical object 77 (FIG. 12(f)).

Since information concerning predetermined physical objects is used to recognize current physical objects, erroneous recognition of two physical objects as a single physical object can be avoided even when a vehicle ahead is close to a roadside object such a traffic sign or when a vehicle in an adjacent lane approaches a vehicle running ahead.

The first and second physical object recognition parts 43 and 44 store the attributes of currently recognized physical objects in the physical object memory 39. The attributes of previously recognized physical objects are also stored in the physical object memory 39. The first and second physical object recognition parts 43 and 44 calculate the relative speed of the vehicle with respect to physical objects based on a value determined from the calculation formula:

(current distance−previous distance)/detection time interval

The relative speed thus calculated is stored in the physical object memory 39. As was described above, the detection time interval is the time difference between the previous measurement and the current measurement, and can be set at, for example 100 milliseconds.

The vehicle controller 45 controls the vehicle mounting the system based on the information such as distance, position and relative speed of the physical objects stored in the physical object memory 39 and based on the information from devices such as an vehicle speed detection device 46 and yaw rate detection device 47 so that the distance to the physical objects is maintained at an appropriate value. For example, the vehicle controller 45 issues a warning to the driver by means of a voice message or sounding an alarm. The controller may also control the speed of the vehicle by forcible deceleration or acceleration.

To ensure recognition of physical objects, preferably judgment is made by the first and second physical object recognition parts 43 and 44 as to whether or not previously recognized objects and currently recognized objects are the same objects, and the vehicle controller 45 responds when the same object is continually recognized a certain predetermined number of times.

The correlation calculating part 6, distance measurement part 7, distance memory 8, window cut-out part 13, distance range memory 9, clustering part 33, cluster grouping part 36, cluster memory 48, judging part 37, physical object memory 39, physical object inferring part 40, cluster selection part 41, candidate generating part 42, first and second physical object recognition parts 43 and 44, inferred physical object memory 49, object memory 50 and vehicle controller 45 can be implemented by a micro-controller which typically includes a central processing unit (CPU), a read-only memory (ROM) containing control programs and data and a random-access memory (RAM) providing an working area for the CPU and temporary storage for various data. In other words, computer programs stored in the ROM implements the above-described functions of the functional blocks shown in FIG. 1.

The distance memory 8, distance range memory 9, cluster memory 48, inferred physical object memory 49, physical object memory 39 and object memory 50 may be realized using different memory areas of a single RAM. Temporary storage areas for data required in various types of operations may also be provided by portions of the same RAM.

The object recognition device of the present invention may be LAN-connected with an engine electronic control unit (ECU), brake-control ECU and other ECU, and the output from this object recognition device can be used for overall control of the vehicle.

Thus it has been shown that, in accordance with the invention. Clustering is performed not based on the measured distances of windows, but rather based on labels corresponding to the distance ranges to which these measured distances belong. Accordingly, high-speed clustering is possible. The distance ranges are set in accordance with the tolerances in the measured distances. Accordingly, accurate clustering is possible.

The intended scope of this invention is defined by the appended claims.

What is claimed is:

1. An object recognition system having one or more image sensors and a controller that is adapted for measuring the distance from the system to objects with respect to respective sections of an image captured by the sensors, comprising:

a memory for storing a plurality of distance ranges, each distance range given a distance label, wherein said controller assigns said distance labels to said sections respectively according to the distance ranges to which the measured distance values belong, and wherein the system is adapted for being carried on a vehicle and the viewing area of said sensors is divided into the plurality of distance ranges according to a tolerance of the measured distance such that the distance ranges become wider as the distance from the system increases.

2. The system of claim 1, wherein the sections having the same distance label are grouped into a same cluster.

3. The system of claim 1, wherein said controller scans said sections having distance labels using a template that defines a joining relationship for the sections and assigns each section with a cluster label that is a combination of the distance label and a occurrence indicia, the occurrence indicia being the same for the sections that satisfies said joining relationship.

4. The system of claim 3, wherein the sections having the same distance label and the same occurrence indicia are united into a cluster.

5. The system of claim 4, wherein said controller generates three dimensional information of each of said clusters based on distance, height and width if the integral clusters.

6. The system of claim 5, wherein said controller groups and clusters into one or more cluster groups based on said three dimensional information such that each cluster group represents a possible physical object.

7. The system of claim 6, wherein said controller stores in a memory three dimensional information of one or more physical objects that were recognized in previous recognition cycle and infers a physical object which would be recognized in the current cycle based on the stored information and a speed of the vehicle mounting said system relative to the physical object.

8. A method for recognizing a physical object from a vehicle, comprising the steps of:

defining a plurality of distance ranges each associated with a distance label;

capturing an image in the traveling direction and measuring distance from the vehicle to objects with respect to a plurality of windows of the image;

assigning said distance labels to said windows respectively according to the distance ranges to which the measured distance values belong; and wherein said distance ranges are defined according to a tolerance of the measured distance such that the distance ranges become larger as the distance from the vehicle increases.

9. The method of claim 8, further comprising the step of:

scanning said windows having distance labels using a template that defines a joining relationship for the windows; and assigning each window with a cluster label that is a combination of the distance label and a occurrence indicia, the occurrence indicia being the same for the windows that satisfy said joining relationship.

10. The method of claim 9, further comprising:

uniting the windows having the same cluster labels into a cluster.

11. The method of claim 10, further comprising:

generating three dimensional data of each of said clusters based on distance from the vehicle, height and width of said clusters.

12. The method of claim 11, further comprising:

combining the clusters that are positioned close to each other based on the three dimensional data to form a candidate of a physical object.

13. The method of claim 12, further comprising:

storing in a memory three dimensional data of one or more physical objects that were recognized in previous recognition cycle; and inferring a physical object which would be recognized in the current cycle based on the stored data and a speed of the vehicle relative to a physical object.

14. The method of claim 11, wherein said distance from the vehicle is determined by averaging distance from the vehicle of the windows constituting the cluster.

15. The method of claim 11, wherein the height of a cluster is determined by the difference between a position of the window at the top of the cluster and a position of the window at the bottom of the cluster.

16. The method of claim 11, wherein the width of a cluster is determined by the difference between a position of the window at the right end of the cluster and a position of the window at the left end of the cluster.

17. The method of claim 13, further comprising:

comparing the inferred physical object with said candidate of a physical object to recognize a physical object.

18. An object recognition system having one or more image sensors and a controller that is adapted for measuring the distance from the system to objects with respect to respective windows of an image captured by the sensors, comprising:

a memory for storing a plurality of distance ranges, each distance range given a distance label;

means for assigning said distance labels to said windows respectively according to the distance ranges to which the measured distance values belong;

means for grouping the windows into clusters according to said distance labels; and means for recognizing a physical object based on said clusters;

wherein the system is adapted for being carried on a vehicle and the viewing area of said sensors is divided into the plurality of distance ranges according to a tolerance of the measured distance such that the distance ranges become broader as the distance from the system increase.

* * * * *

UNITED STATES PATENT AND TRADEMARK OFFICE
CERTIFICATE OF CORRECTION

PATENT NO. : 6,853,738 B1 Page 1 of 1
APPLICATION NO. : 09/572249
DATED : February 8, 2005
INVENTOR(S) : Morimichi Nishigaki et al.

It is certified that error appears in the above-identified patent and that said Letters Patent is hereby corrected as shown below:

In the Claims

Column 21, line 6, replace "if" with --of--.

Column 21, lines 7 and 8, replace "groups and clusters" with --groups the clusters--.

Signed and Sealed this

Seventeenth Day of April, 2007

JON W. DUDAS
*Director of the United States Patent and Trademark Office*